Nov. 9, 1926. 1,606,241

F. R. KLAUS

DEMOUNTABLE RIM

Original Filed Oct. 6, 1921

Inventor
F. R. KLAUS.

Lloyd L. Evans
— Attorney

Patented Nov. 9, 1926.

1,606,241

UNITED STATES PATENT OFFICE.

FRED R. KLAUS, OF WARREN, OHIO, ASSIGNOR TO THE AMERICAN WELDING AND MANUFACTURING COMPANY, OF WARREN, OHIO, A CORPORATION OF OHIO.

DEMOUNTABLE RIM.

Application filed October 6, 1921, Serial No. 505,906. Renewed March 23, 1926.

This invention relates to improvements in split demountable rims and has as its object the provision of means to hold the ends of the rim in position to prevent relative movement in service.

A further object is to provide a rim easily collapsible so that a pneumatic tire can be easily put on and taken off.

A further object is to provide a simple and efficient construction which can be manufactured cheaply to accomplish the above mentioned objects.

Referring to the accompanying drawings forming a part of this specification,

Figure 1:
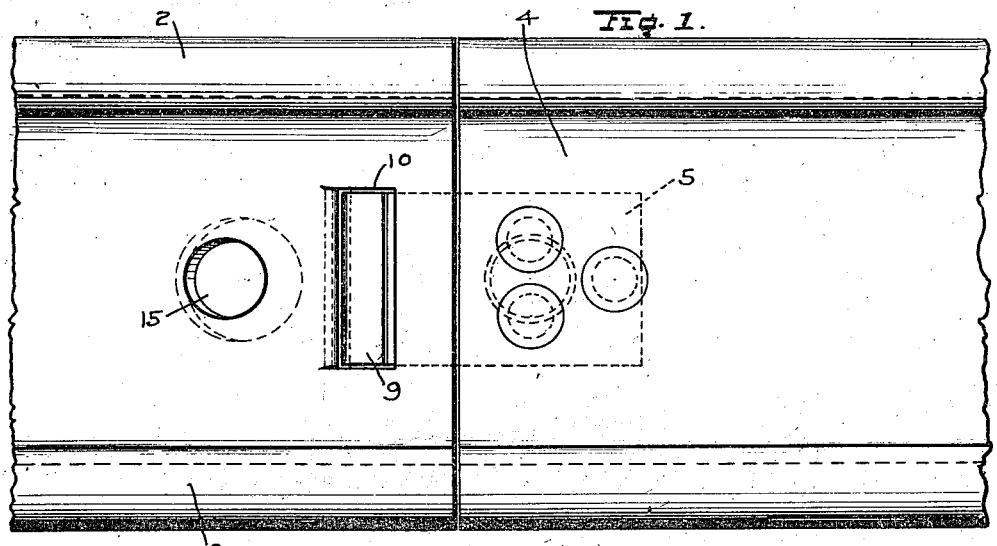
Figure 1 is a plan view of the rim showing the rim ends.
Figure 2:
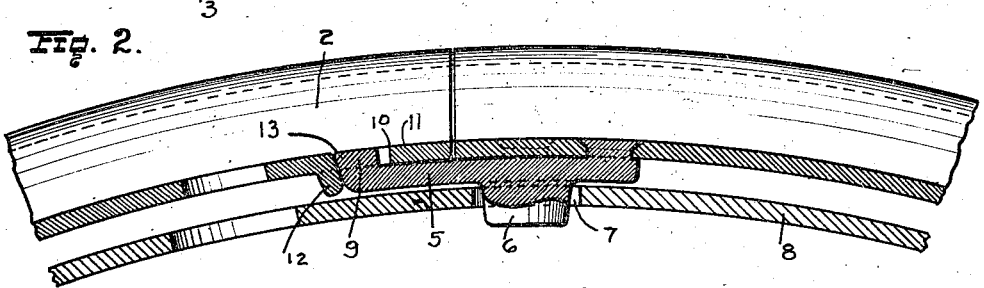
Fig. 2 is a longitudinal section of the same.
Figure 3:
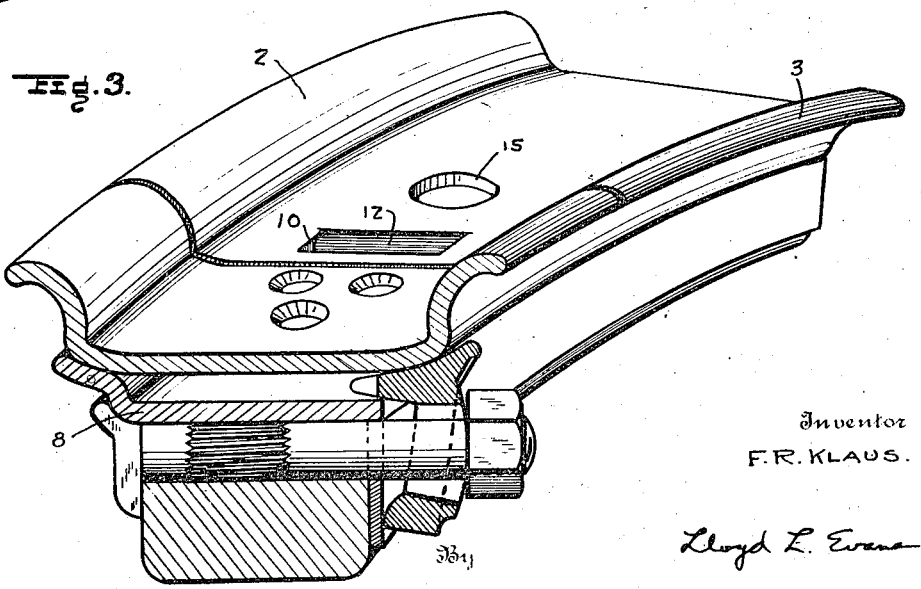
Fig. 3 is a perspective showing the rim ends, together with the rim applied to a conventional type of wheel. In this figure the plate or tongue member to engage the aperture in the other end of the rim is omitted.

The rim generally designated 1 is shown with integral tire retaining flanges 2 and 3. This rim is split preferably at one point only. Secured to the end 4 of the rim is a plate 5 carrying driving lug 6 to engage with a suitable aperture 7 in the felly 8 of the wheel. The plate or tongue 5 may be riveted or otherwise fastened to the base of the rim and extends beyond the end of the rim terminating in a hook 9 to engage in aperture 10 of the other end 11 of the rim. The aperture 10 in the end 11 of the rim is formed by striking down a lip 12 from the base of the rim. The hook 9 and lip 12 are formed with surfaces oblique to the main body member of the tongue 5 and base of the rim respectively. The oblique surfaces of the tongue 9 and the lip 12 engage to prevent relative radial movement of the ends of the rim, when a rim is in position on a wheel or when the rim is carrying a pneumatic tire inflated. In order to collapse the rim when it is demounted from the wheel to remove the tire it is necessary either to first expand the rim circumferentially and then press down on the end 4 of the rim in order that the corner 13 of hook 9 may pass the corner 14 of the lip 12, or pressure can simply be applied to the end 4 of the rim to cause simultaneous expansion of the rim and movement of hook 9 radially inward for it to pass the lip 12 in order that the end 4 of the rim may underlie the end 11. When the end 4 of the rim underlies the end 11 the rim is easily contracted so that the tire may be quickly removed therefrom, as is the ordinary procedure with a split demountable rim. The relative circumferential movement of the ends of the rim is limited by the size of the aperture 10 and should be only sufficient to permit easy movement of the hook 9 on lip 12 as the rim is collapsed or as it is snapped into tire holding position. An aperture 15 is provided for the valve stem of the inner tube used with a tire. In Fig. 3 the rim is shown mounted on a conventional wood felly carrying a metal felly band and the rim is held in position with an ordinary bolt and wedge device.

It will thus be seen that I have provided a simple and efficient means to prevent relative movement between the ends of the rim when in service. When the hook 9 is in engagement with the aperture of the other end of the rim, lateral movement of the ends of the rim is prevented, relatively radial movement of the ends of the rim is prevented without a limited circumferential movement thereof and whenever a tire is mounted upon the rim and inflated the air pressure will prevent circumferential movement whether the rim be mounted as a spare upon the tire carrier, or in service upon the wheel. When the tire is deflated and the rim is demounted it is easy to collapse the rim, for the oblique engaging edges of the hook 9 and the lip 12 simply form a wedge means to aid in accomplishing the circumferential expansion of the rim to permit the hook to clear the lip. When this is done the rim is easily collapsed and the tire removed. If the tire becomes deflated when the rim is mounted on the wheel the rim cannot collapse as the tongue 5 cannot move radially inwardly sufficiently for the hook 9 to underlie lip 12.

Having described my invention, what I claim is:

1. A one piece transplit rim having a plate permanently attached to one rim end and detachably connected to its other end, said other end having an opening provided with an inwardly extending edge, the free end of the plate having an outwardly turned end adapted to fit into said opening, the opening being somewhat larger than the turned end of plate permitting a limited amount of circumferential movement between the rim ends when said turned end of plate is in engagement with the opening in the rim base.

2. A one piece transplit tire carrying rim having an opening near one end, and an inwardly projecting portion at the edge of said opening remote from the split, and a plate connected to the other end of the rim and projecting beyond the split, the free end of said plate having an outwardly projecting portion adapted to fit into the opening, said end being adapted to ride against the edge of opening and inwardly projecting portion of rim base.

3. A one piece transplit tire carrying rim having an opening in the base thereof near one end, the edge remote from the end being provided with an inwardly projecting guide and retaining member, and a plate rigidly connected to the other end of the rim and extending beyond the split, the free end of said plate being provided with an outwardly projecting portion adapted to fit into the opening in the rim base, the end of the plate being shaped for engagement with the inwardly projecting guide and retaining member.

4. A one piece transplit tire carrying rim having an opening in the base thereof, the metal at the edge of said opening remote from the end of the rim being carried inwardly and providing a combined guiding and retaining member, a plate permanently connected to the opposite end of the rim and having at its free end an outwardly projecting portion adapted to fit into the opening in the rim base, said opening being slightly larger than the outwardly projecting portion of the plate whereby a limited amount of circumferential movement between rim ends is permitted.

5. A one piece transplit demountable tire carrying rim having a plate connected to one end and extending beyond the split, the free end of said plate having an outwardly projecting portion, the rim base of the other end having an opening therein, said rim base having an integral inwardly projecting portion so disposed with reference to the edges of the opening as to hold the free end of the plate when positioned in the opening against radial movement.

In testimony whereof, I hereunto affix my signature.

FRED R. KLAUS.